US007984492B2

(12) United States Patent
Soliman et al.

(10) Patent No.: US 7,984,492 B2
(45) Date of Patent: Jul. 19, 2011

(54) METHODS AND APPARATUS FOR POLICY ENFORCEMENT IN A WIRELESS COMMUNICATION SYSTEM

(75) Inventors: Hesham Soliman, Endeavour Hills (AU); Vincent Park, Budd Lake, NJ (US); David R. Mazik, Howell, NJ (US); Mathew Scott Corson, Gillette, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1036 days.

(21) Appl. No.: 11/778,636

(22) Filed: Jul. 16, 2007

(65) Prior Publication Data

US 2008/0083013 A1 Apr. 3, 2008

Related U.S. Application Data

(60) Provisional application No. 60/830,995, filed on Jul. 14, 2006.

(51) Int. Cl.
*G06F 15/163* (2006.01)
*G06F 17/00* (2006.01)

(52) U.S. Cl. ............ 726/11; 726/12; 709/227; 709/238; 709/239

(58) Field of Classification Search .................. 709/227, 709/238, 239
See application file for complete search history.

(56) References Cited

U.S. PATENT DOCUMENTS

| 6,286,052 B1 * | 9/2001 | McCloghrie et al. ......... 709/238 |
| 6,651,105 B1 * | 11/2003 | Bhagwat et al. ............. 709/239 |
| 7,293,095 B2 * | 11/2007 | Gbadegesin ................. 709/227 |
| 2004/0225534 A1 | 11/2004 | Zheng | |

OTHER PUBLICATIONS

Durham et al., "COPS Usage for AAA," IETF Standard Internet Draft, May 31, 2000, Internet Engineering Task Force, XP015012686.
Chaouchi, "A new policy-aware terminal for QoS AAA and mobility management," International Journal of Network Management, Mar. 2004, pp. 77-87, vol. 14, No. 2, Retrieved from the Internet.
Durham et al., "The COPS (Common Open Policy Service) Protocol," Request for Comments 2748, IETF Standard, Internet Engineering Task Force, Jan. 2000, XP015008531.
Phanse et al., "Protocol Support for Policy-Based Management of Mobile Ad Hoc Networks," Network Operations and Management Symposium, IEEE/IFIP, Seoul, Korea, Apr. 19-23, 2004, pp. 3-16, vol. 1, IEEE, Piscataway, NJ, USA, XP010712679.
Ferrus et al., "A Feasible Approach for QoS Management in Coordinated Heterogeneous Radio Access Networks," Performance, Computing, and Communications Conference, 2005, 24TH IEEE International, Phoenix, AZ, Apr. 7-9, 2005, pp. 607-814, IEEE, Piscataway, NJ, USA, XP010812729.
International Search Report, PCT/US07/073638, International Search Authority, European Patent Office, May 8, 2008.
Written Opinion, PCT/US07/073638, International Search Authority, European Patent Office, May 8, 2008.

* cited by examiner

*Primary Examiner* — Kambiz Zand
*Assistant Examiner* — William S Powers
(74) *Attorney, Agent, or Firm* — Milan I. Patel; Jonathan T. Velasco

(57) ABSTRACT

An apparatus and associated method is provided for facilitating policy decision in a communication system, wherein the apparatus receiving a message, the message comprising a first destination device identification of a first destination device, determining a second destination device identification of a second destination device by accessing a location information of a wireless terminal, and replacing the first destination device identification with second destination device identification.

19 Claims, 6 Drawing Sheets

METHODS AND APPARATUS FOR POLICY ENFORCEMENT IN A WIRELESS COMMUNICATION SYSTEM

RELATED APPLICATIONS

The present application claims the benefit of U.S. Provisional Patent Application Ser. No. 60/830,995, filed on Jul. 14, 2006, titled "METHOD AND APPARATUS FOR POLICY ENFORCEMENT" which is hereby expressly incorporated by reference.

FIELD

This invention relates to communications system and, more particularly, to methods and apparatus for facilitating policy decision and enforcement

BACKGROUND

In a communication system, when a wireless terminal desires to add, use or modify certain resources, the wireless terminal make a request to a Policy Enforcement Point (PEP). The PEP in turns communicates with Policy Decision Point (PDP), which is a part of a core network, to carry out the wireless terminal's request. The main reason for having a policy control protocol is to allow PDPs to authorize the use of network resources based on local policies within an operator's domain. Policy control is not limited to certain applications. However, it is expected to be used for applications that require resource reservation. In addition to authorizing the use of network resources based on local policies, policy control may have direct knowledge about whether a resource is in fact being used by the device. This is done through interfacing to session control elements within the network that ensure the binding between sessions that are being negotiated or already established and the requested resources for such sessions.

Generally, the PDP performs various checks to determine if the requesting wireless terminal is allowed access to the requested resources. Once the determination is made, the PDP communicates to the PEP of the decision. PEP then relay this information to the wireless terminal. In a fixed network, the PDP is aware of which PEP made the request on behalf of the wireless terminal. Also, PEP is aware of the status and information about the PDP while it awaits a response from PDP. In a fixed network, this PEP is the only one that knows the request information and status of PDP and terminals generally communicate with that PEP. However, in a mobile network this poses a problem. This especially true, for a mobile network that uses Internet Access Nodes (AN) (e.g. Internet access routers embodied in core routers/gateways or in base stations) to communicate with wireless terminal and the PEP are configured to be part of each AN. If a wireless terminal moves to a new PEP (ie AN), the new PEP would not know about the pending resource request made to a PDP by the previous PEP. The PDP cannot associate a static PEP with a particular subscriber as the PEP will likely change several times during a session. Generally, the PEP only maintains information about allocated resource that it assisted in getting. In a mobile network, it is common that a wireless terminal may move within a large geographical area. Thus, the wireless terminal may move from one AN to another. It is possible that the wireless terminal makes a request using a first PEP at a first AN and moves to another PEP and AN before the PDP has a chance to reply. Therefore, there is a need for a system that allows the wireless terminal to make a request using one PEP and receive a reply at another PEP and modify an existing resource established at one PEP through another.

SUMMARY

In accordance with various embodiments, a method provided for facilitating policy decision in a communication system, the method receiving a message, at a current device, wherein the message comprising a transmitting device identification of a transmitting device and a destination device identification of a destination device; replacing, the transmitting identification with a current device identification of the current device; and transmitting the message to the destination device, wherein the destination device configured to make policy decisions.

In another aspect, a method is provided for facilitating policy decision in a communication system, the method receiving a message, at a current device, the message comprising a first destination device identification of a first destination device; determining a second destination device identification of a second destination device by accessing a location information of a wireless terminal; and replacing the first destination device identification with second destination device identification.

In accordance with another aspect, an apparatus for facilitating policy decision in a communication system provided, the apparatus having a means for receiving a message, at a current device, wherein the message comprising a transmitting device identification of a transmitting device and a destination device identification of a destination device; a means for replacing, the transmitting identification with a current device identification of the current device; and a means for transmitting the message to the destination device, wherein the destination device configured to make policy decisions.

In accordance with another aspect, an apparatus for facilitating policy decision in a communication system, the apparatus having a means for receiving a message, at a current device, the message comprising a first destination device identification of a first destination device; a means for determining a second destination device identification of a second destination device by accessing a location information of a wireless terminal; and a means for replacing the first destination device identification with second destination device identification.

A more complete appreciation of all the advantages and scope of the aspect can be obtained from the accompanying drawings, the description and the appended claims.

DETAILED DESCRIPTION

Figure 1:
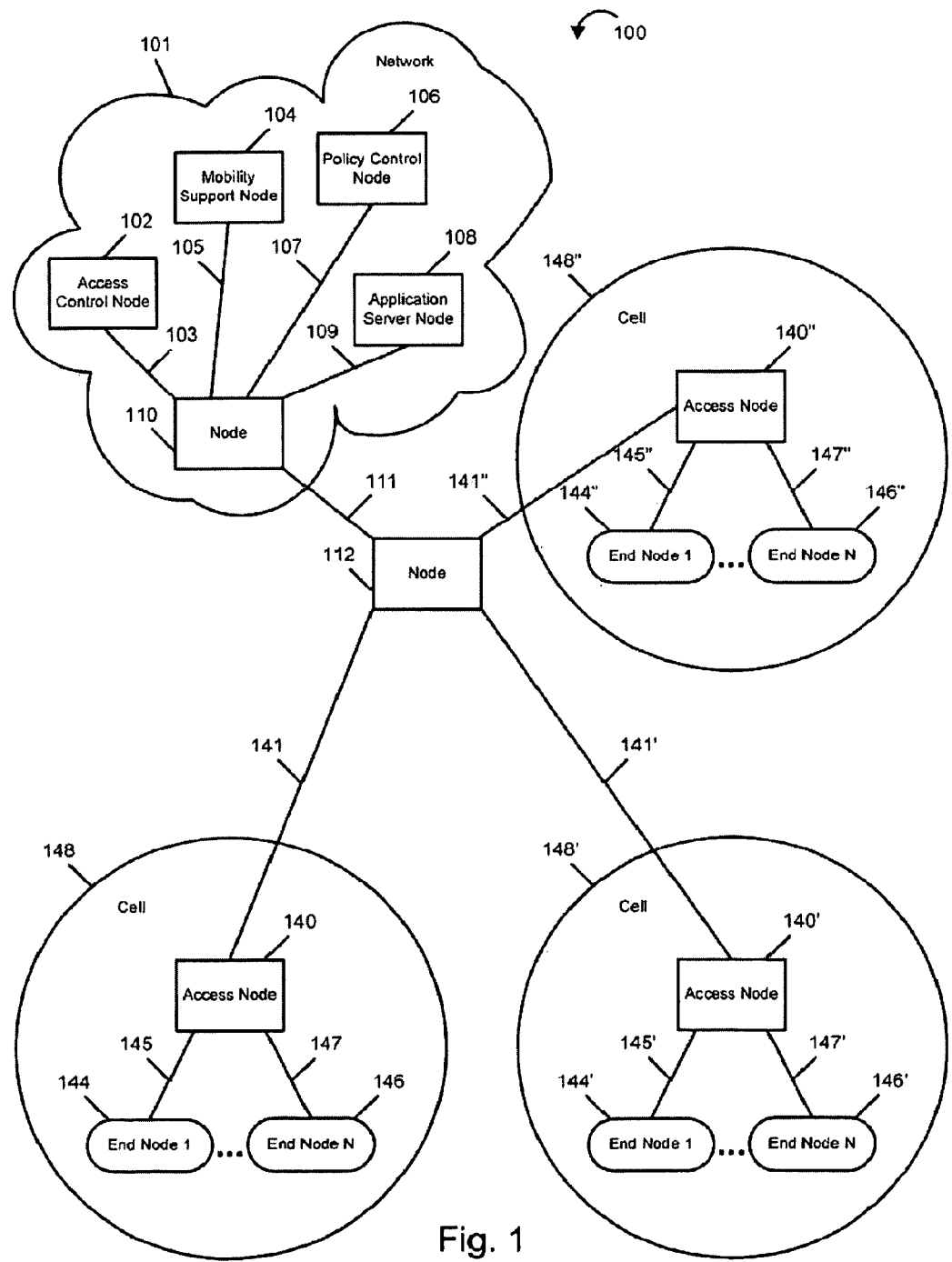
FIG. 1 illustrates a network diagram of an exemplary communications system.

This aspect relates to communications system and, more particularly, to methods and apparatus for supporting quality of service differentiation between traffic flows in a communication system FIG. 1 illustrates an exemplary communication system 100 implemented in accordance with an aspect, e.g., a cellular communication network, which comprises a plurality of nodes interconnected by communications links. The network may use Orthogonal Frequency Division Multiplexing (OFDM) signals to communicate information over wireless links. However, other types of signals, e.g., Code Division Multiple Access (CDMA) signals or Time Division Multiple Access (TDMA) signals, might be used instead. Nodes in the exemplary communication system 100 exchange information using signals, e.g., messages, based on communication protocols, e.g., the Internet Protocol (IP). The communications links of the system 100 may be implemented, for example, using wires, fiber optic cables, and/or wireless communications techniques. The exemplary communication system 100 includes a plurality of access terminals 144, 146, 144', 146', 144", 146", which access the communication system via a plurality of access points 140, 140', 140". The access terminals 144, 146, 144', 146', 144", 146" may be, e.g., wireless communication devices or terminals, and the access points 140, 140', 140" may be, e.g., wireless access routers or base stations. The exemplary communication system 100 also includes a number of other nodes 102, 104, 106, 108, 110, and 112, used to provide interconnectivity or to provide specific services or functions.

The FIG. 1 exemplary system 100 depicts a network 101 that includes an access control node 102, a mobility support node 104, a policy control node 106, and an application server node 108, all of which are connected to an intermediate network node 110 by a corresponding network link 103, 105, 107, and 109, respectively. In some embodiments, the access control node, e.g., a Remote Authentication Dial In User Service (RADIUS) or Diameter server, supports authentication, authorization, and/or accounting of access terminals and/or services associated with access terminals. In some embodiments, the mobility support node, e.g., a Mobile IP home agent and/or context transfer server, supports mobility, e.g., handoff, of access terminals between access points, e.g., via redirection of traffic to/from access terminals and/or transfer of state associated with access terminals between access points. In some embodiments, the policy control node, e.g., a policy server or Policy Decision Point (PDP), supports policy authorization for services or application layer sessions. In some embodiments, the application server node, e.g., a Session Initiation Protocol server, streaming media server, or other application layer server, supports session signaling for services available to access terminals and/or provides services or content available to access terminals.

The intermediate network node 110 in the network 101 provides interconnectivity to network nodes that are external from the perspective of the network 101 via network link 111. Network link 111 is connected to another intermediate network node 112, which provides further connectivity to a plurality of access points 140, 140', 140" via network links 141, 141', 141", respectively.

Each access point 140, 140', 140" is depicted as providing connectivity to a plurality of N access terminals (144, 146), (144', 146'), (144", 146"), respectively, via corresponding access links (145, 147), (145', 147'), (145", 147"), respectively. In the exemplary communication system 100, each access point 140, 140', 140" is depicted as using wireless technology, e.g., wireless access links, to provide access. A radio coverage area, e.g., communications cell, 148, 148', 148" of each access point 140, 140', 140", respectively, is illustrated as a circle surrounding the corresponding access point.

The exemplary communication system 100 is subsequently used as a basis for the description of various embodiments. Alternative embodiments of the aspect include various network topologies, where the number and type of nodes (including network nodes, access points, access terminals, as well as various control, support, and server nodes), the number and type of links, and the interconnectivity between various nodes may differ from that of the exemplary communication system 100 depicted in FIG. 1.

Figure 2:
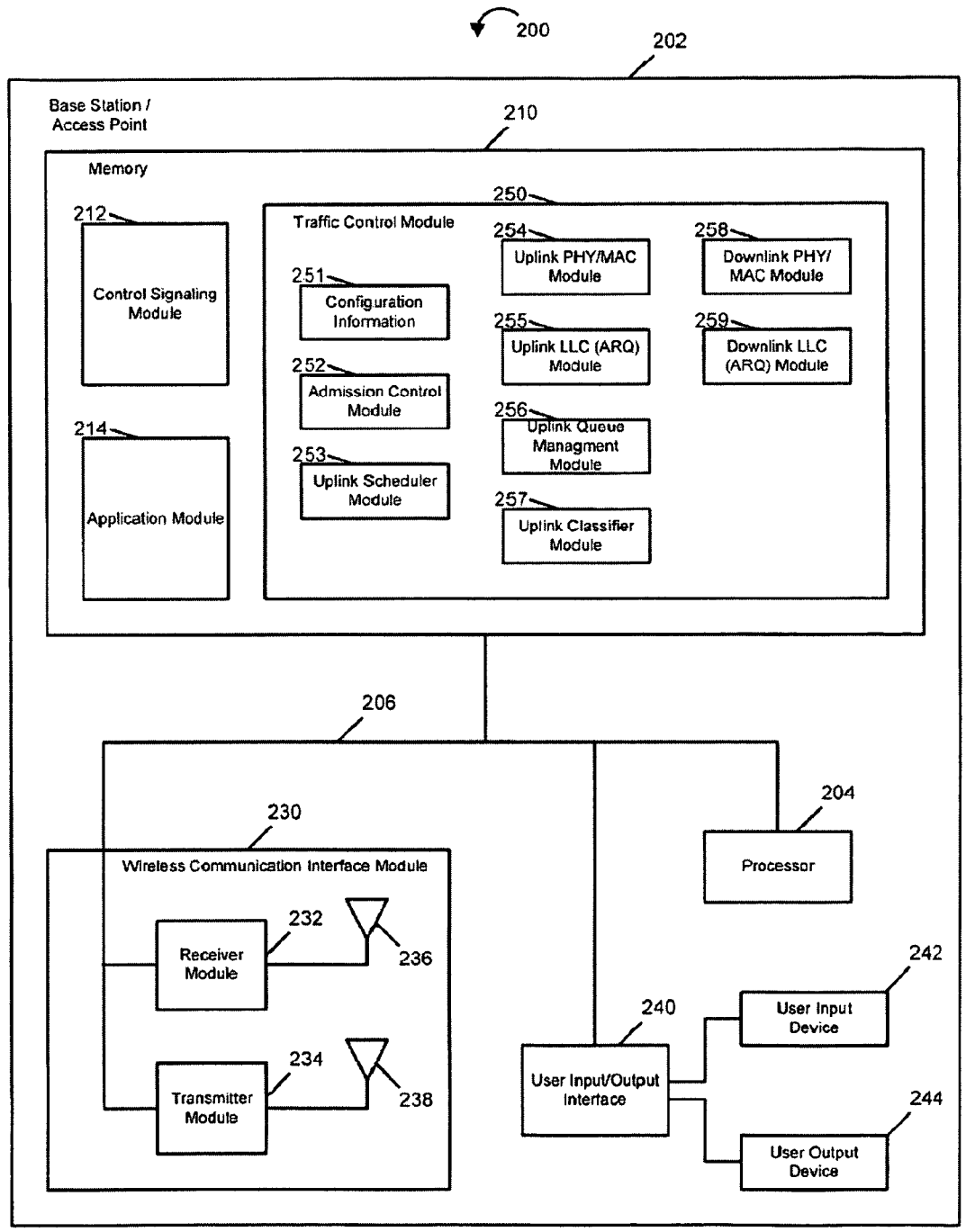
FIG. 2 illustrates an exemplary access terminal.

FIG. 2 provides a detailed illustration of an exemplary access terminal 200, e.g., wireless terminal. The exemplary access terminal 200, depicted in FIG. 2, is a detailed representation of an apparatus that may be used as any one of the access terminals 144, 146, 144', 146', 144", 146", depicted in FIG. 1. According to an aspect, in the FIG. 2 embodiment, the access terminal 200 includes a processor 204, a wireless communication interface module 230, a user input/output interface 240 and memory 210 coupled together by bus 206. Accordingly, via bus 206 the various components of the access terminal 200 can exchange information, signals and data. The components 204, 206, 210, 230, 240 of the access terminal 200 are located inside a housing 202.

The wireless communication interface module 230 provides a mechanism by which the internal components of the access terminal 200 can send and receive signals to/from external devices and network nodes, e.g., access points. The wireless communication interface module 230 includes, e.g., a receiver module 232 with a corresponding receiving antenna 236 and a transmitter module 234 with a corresponding transmitting antenna 238 used for coupling the access terminal 200 to other network nodes, e.g., via wireless communications channels.

The exemplary access terminal 200 also includes a user input device 242, e.g., keypad, and a user output device 244, e.g., display, which are coupled to bus 206 via the user input/output interface 240. Thus, user input/output devices 242, 244 can exchange information, signals and data with other components of the access terminal 200 via user input/output interface 240 and bus 206. The user input/output interface 240 and associated devices 242, 244 provide a mechanism by which a user can operate the access terminal 200 to accomplish various tasks. In particular, the user input device 242 and user output device 244 provide the functionality that allows a user to control the access terminal 200 and applications, e.g., modules, programs, routines and/or functions, that execute in the memory 210 of the access terminal 200.

The processor 204 under control of various modules, e.g., routines, included in memory 210 controls operation of the access terminal 200 to perform various signaling and processing. The modules included in memory 210 are executed on startup or as called by other modules. Modules may exchange data, information, and signals when executed. Modules may also share data and information when executed. In the FIG. 2 embodiment, the memory 210 of access terminal 200 of the includes a control signaling module 212, an application module 214, and a traffic control module 250, which further includes configuration information 251 and various additional modules 252, 253, 254, 255, 256, 257, 258, and 259.

The control signaling module 212 controls processing relating to receiving and sending signals, e.g., messages, for controlling operation and/or configuration of various aspects of the access terminal 200 including, e.g., the traffic control module 250 as well as the configuration information 251 and the various additional modules included therein 252, 253, 254, 255, 256, 257, 258, and 259. In some embodiments of the, the control signaling module 212 includes state information, e.g., parameters, status and/or other information, relating to operation of the access terminal 200 and/or one or more signaling protocols supported by the control signaling module 212. In particular, the control signaling module 212 may include configuration information, e.g., access terminal identification information and/or parameter settings, and operational information, e.g., information about current processing state, status of pending message transactions, etc.

The application module 214 controls processing and communications relating to one or more applications supported by the access terminal 200. In some embodiments of the aspect, application module 214 processing includes tasks relating to input/output of information via the user input/output interfaces 240, manipulation of information associated with an application, and/or receiving or sending signals, e.g., messages, associated with an application. In some embodiments, the application module 214 includes state information, e.g., parameters, status and/or other information, relating to operation of one or more applications supported by the application module 214. In particular, the application module 214 may include configuration information, e.g., user identification information and/or parameter settings, and operational information, e.g., information about current processing state, status of pending responses, etc. Applications supported by the application module 214 include, e.g., Voice over IP (VoIP), web browsing, streaming audio/video, instant messaging, file sharing, gaming, etc.

The traffic control module 250 controls processing relating to receiving and sending data information, e.g., messages, packets, and/or frames, via the wireless communication interface module 230. The exemplary traffic control module includes configuration information 251 as well as various additional modules 252, 253, 254, 255, 256, 257, 258, and 259 that control various aspects of quality of service for packets and/or traffic flows, e.g., associated sequences of packets. In some embodiments, the traffic control module 250 includes state information, e.g., parameters, status and/or other information, relating to operation of the access terminal 200, the traffic control module 250, and/or one or more of the various additional modules included therein 252, 253, 254, 255, 256, 257, 258, and 259. The configuration information 251, e.g., parameter settings, determines, affects and/or prescribes operation of the traffic control module 250 and/or the various additional modules included therein 252, 253, 254, 255, 256, 257, 258, and 259. The various additional modules are included, in some embodiments, to perform particular functions and operations as needed to support specific aspects of traffic control. In various embodiments, modules may be omitted and/or combined as needed depending on the functional requirements of traffic control. A description of each additional module included in the exemplary traffic control module 250 follows.

The admission control module 252 maintains information relating to resource utilization/availability and determines if sufficient resources are available to support the quality of service requirements of particular traffic flows. Resource availability information maintained by the admission control module 252 includes, e.g., packet and/or frame queuing capacity, scheduling capacity, as well as processing and memory capacity needed to support one or more traffic flows. The control signaling module 212, application module 214, and/or other modules included in the access terminal 200 may, and in some embodiments do, query the admission control module 252 to determine if sufficient resources are available to support a new or modified traffic flow, where the admission control determination is a function of the quality of service requirements of the particular traffic flow and/or the available resources. The configuration information 251 may, and in some embodiments does, include configuration information, e.g., parameters settings, that affect the operation of the admission control module 252, e.g., an admission control threshold value that indicates the percentage of resource that may be allocated prior to rejecting additional requests.

The uplink scheduler module 253 controls processing relating to transmission scheduling, e.g., order and/or timing, and allocation of transmission resources, e.g., information coding rate, transmission time slots, and/or transmission power, for data information, e.g., messages, packets, and/or frames, to be sent via the wireless interface module 230, e.g., from the access terminal 200 to an access point. The uplink scheduler module 253 may, and in some embodiments does, schedule transmissions and allocate transmission resources as a function of the quality of service requirements and/or constraints associated with one or more traffic flows. The configuration information 251 may, and in some embodiments does, include configuration information, e.g., parameters settings, that affect the operation of the uplink scheduler module 253, e.g., a priority, rate bound, latency bound, and/or sharing weight associated with one or more traffic flows. In some embodiments of the aspect, scheduling and/or resource allocation operations performed by the uplink scheduler module 253 are additionally a function of channel conditions and other factors, e.g., power budget.

The uplink PHY/MAC module 254 controls physical (PHY) layer and Media Access Control (MAC) layer processing relating to sending data information, e.g., messages, packets, and/or frames, via the wireless communication interface module 230, e.g., from the access terminal 200 to an access point. In some embodiments of the aspect, operation of the uplink PHY/MAC module 254 includes both sending and receiving control information, e.g., signals or messages, to coordinate sending of data information, e.g., messages, packets, or frames. The configuration information 251 may, and in some embodiments does, include configuration information, e.g., parameters settings, that affect the operation of the uplink PHY/MAC module 254, e.g., a frequency, band, channel, spreading code or hoping code to be used for transmissions, an identifier associated with the access terminal 200, a request dictionary prescribing use of an assignment request channel, etc.

The uplink Logical Link Control (ARQ) module 255 controls Logical Link Control (LLC) layer processing relating to sending data information, e.g., messages, packets, and/or frames, via the wireless communication interface module 230, e.g., from the access terminal 200 to an access point. The uplink LLC (ARQ) module 255 includes processing associated with Automatic Repeat Request (ARQ) capabilities, e.g., retransmission of lost packets or frames. In some embodiments of the aspect, the uplink LLC (ARQ) module 255 further includes processing relating to the addition of an LLC header and/or trailer to higher layer messages, e.g., packets, to provide additional functionality, e.g., multi-protocol multiplexing/demultiplexing via a type field or error detection via a checksum field. The uplink LLC (ARQ) module 255 may also, and in some embodiments does, perform fragmentation of higher layer messages, e.g., packets, into multiple sub-portions, e.g., frames to be sent by the uplink PHY/MAC module 254. The configuration information 251 may, and in some embodiments does, include configuration information, e.g., parameters settings, that affect the operation of the uplink LLC (ARQ) module 255, e.g., an ARQ window size, maximum number of retransmissions, a discard timer, etc.

The uplink queue management module 256 maintains information and controls processing relating to storage of data information, e.g., messages, packets, and/or frames, to be sent via the wireless communication interface module 230, e.g., from the access terminal 200 to an access point. The uplink queue management module 256 may, and in some embodiments does, control storage of data information awaiting transmission and maintain state information regarding data information awaiting transmission on a per traffic flow basis, e.g., packets associated with each traffic flow may be stored in separate queues. In some embodiments of the aspect, the uplink queue management module 256 supports a variety of queue management techniques and/or capabilities, e.g., head drop, tail drop, as well as various Active Queue Management (AQM) mechanisms such as Random Early Detection (RED). The configuration information 251 may, and in some embodiments does, include configuration information, e.g., parameters settings, that affect the operation of the uplink queue management module 256, e.g., a queue limit, drop strategy, and/or AQM thresholds associated with one or more traffic flows.

The uplink classifier module 257 controls processing relating to identification of data information, e.g., messages, packets, and/or frames, as belonging to particular traffic flows prior to being sent via the wireless communication interface module 230, e.g., from the access terminal 200 to an access point. In some embodiments of the aspect, messages, packets, and/or frames to be sent via the wireless communication interface module 230 are classified as belonging to one of a variety of traffic flows by the uplink classifier module 257 based on inspection of one or more header and/or payload fields. The results of classification by the uplink classifier module 257 may, and in some embodiments do, affect the treatment of the classified data information, e.g., messages, packets, and/or frames, by the uplink queue management module 256 and other modules 253, 254, 255, e.g., the results may determine a particular queue the message, packet, and/or frame will be associated with for storage and further affect subsequent processing such as scheduling. The configuration information 251 may, and in some embodiments does, include configuration information, e.g., parameters settings, that affect the operation of the uplink classifier module 257, e.g., a set of one or more classifier filter rules that prescribe criteria used to associate data information, e.g., messages, packets, and/or frames, as belonging to one or more traffic flows.

The downlink PHY/MAC module 258 controls PHY layer and MAC layer processing relating to receiving data information, e.g., packets and/or frames, via the wireless communication interface module 230, e.g., from an access point to the access terminal 200. In some embodiments of the aspect, operation of the downlink PHY/MAC module 258 includes both sending and receiving control information, e.g., signals or messages, to coordinate receiving of data information, e.g., messages, packets, or frames. The configuration information 251 may, and in some embodiments does, include configuration information, e.g., parameters settings, that affect the operation of the downlink PHY/MAC module 258, e.g., a frequency, band, channel, spreading code or hoping code to be used for reception, an identifier associated with the access terminal 200, etc.

The downlink LLC (ARQ) module 259 controls LLC layer processing relating to receiving data information, e.g., packets and/or frames, via the wireless communication interface module 230, e.g., from an access point to the access terminal 200. The downlink LLC (ARQ) module 259 includes processing associated with ARQ capabilities, e.g., retransmission of lost packets or frames. In some embodiments of the aspect, the downlink LLC (ARQ) module 259 further includes processing relating to an LLC header and/or trailer that encapsulates higher layer messages, e.g., packets, which provides additional functionality, e.g., multi-protocol multiplexing/demultiplexing via a type field or error detection via a checksum field. The downlink LLC (ARQ) module 259 may also, and in some embodiments does, perform reassembly of frames received by the downlink PHY/MAC module 258 into higher layer messages, e.g., packets. The configuration information 251 may, and in some embodiments does, include configuration information, e.g., parameters settings, that affect the operation of the downlink LLC (ARQ) module 259, e.g., an ARQ window size, maximum number of retransmissions, a discard timer, etc.

Figure 3:
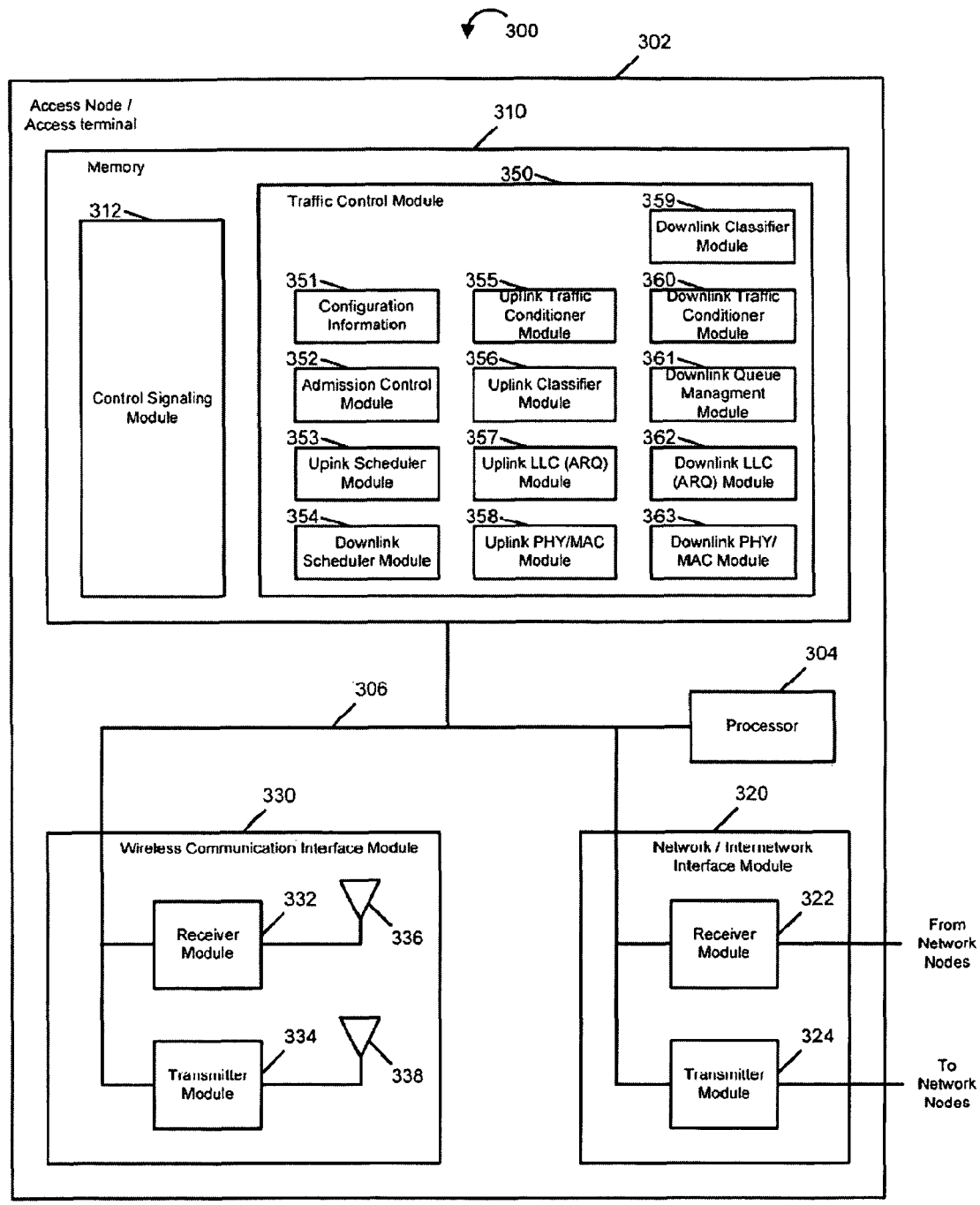
FIG. 3 illustrates an exemplary access point.

FIG. 3 provides a detailed illustration of an exemplary access point 300 implemented in accordance with the. The exemplary access point 300, depicted in FIG. 3, is a detailed representation of an apparatus that may be used as any one of the access points 140, 140', 140" depicted in FIG. 1. In the FIG. 3 embodiment, the access point 300 includes a processor 304, memory 310, a network/internetwork interface module 320 and a wireless communication interface module 330, coupled together by bus 306. Accordingly, via bus 306 the various components of the access point 300 can exchange information, signals and data. The components 304, 306, 310, 320, 330 of the access point 300 are located inside a housing 302.

The network/internetwork interface module 320 provides a mechanism by which the internal components of the access point 300 can send and receive signals to/from external devices and network nodes. The network/internetwork interface module 320 includes, a receiver module 322 and a transmitter module 324 used for coupling the node 300 to other network nodes, e.g., via copper wires or fiber optic lines. The wireless communication interface module 330 also provides a mechanism by which the internal components of the access point 300 can send and receive signals to/from external devices and network nodes, e.g., access terminals. The wireless communication interface module 330 includes, e.g., a receiver module 332 with a corresponding receiving antenna 336 and a transmitter module 334 with a corresponding transmitting antenna 338. The wireless communication interface module 330 is used for coupling the access point 300 to other nodes, e.g., via wireless communication channels.

The processor 304 under control of various modules, e.g., routines, included in memory 310 controls operation of the access point 300 to perform various signaling processing. The modules included in memory 310 are executed on startup or as called by other modules. Modules may exchange data, information, and signals when executed. Modules may also share data and information when executed. In the FIG. 3 embodiment, the memory 310 of access point 300 of the includes a control signaling module 312 and a traffic control module 350, which further includes configuration information 351 and various additional modules 352, 353, 354, 355, 356, 357, 358, 359, 360, 361, 362, and 363.

The control signaling module 312 controls processing relating to receiving and sending signals, e.g., messages, for controlling operation and/or configuration of various aspects of the access point 300 including, e.g., the traffic control module 350 as well as the configuration information 351 and the various additional modules included therein 352, 353, 354, 355, 356, 357, 358, 359, 360, 361, 362, and 363. In some embodiments of the aspect, the control signaling module 312 includes state information, e.g., parameters, status and/or other information, relating to operation of the access point 300 and/or one or more signaling protocols supported by the control signaling module 312. In particular, the control signaling module 312 may include configuration information, e.g., access point identification information and/or parameter settings, and operational information, e.g., information about current processing state, status of pending message transactions, etc.

The traffic control module 350 controls processing relating to receiving and sending data information, e.g., messages, packets, and/or frames, via the wireless communication interface module 330. The exemplary traffic control module includes configuration information 351 as well as various additional modules 352, 353, 354, 355, 356, 357, 358, 359, 360, 361, 362, and 363 that control various aspects of quality of service for packets and/or traffic flows, e.g., associated sequences of packets. In some embodiments of the aspect, the traffic control module 350 includes state information, e.g., parameters, status and/or other information, relating to operation of the access point 300, the traffic control module 350, and/or one or more of the various additional modules included therein 352, 353, 354, 355, 356, 357, 358, 359, 360, 361, 362, and 363. The configuration information 351, e.g., parameter settings, determines, affects and/or prescribes operation of the traffic control module 350 and/or the various additional modules included therein 352, 353, 354, 355, 356, 357, 358, 359, 360, 361, 362, and 363. The various additional modules are included, in some embodiments, to perform particular functions and operations as needed to support specific aspects of traffic control. In various embodiments of the aspect, modules may be omitted and/or combined as needed depending on the functional requirements of traffic control. A description of each additional module included in the exemplary traffic control module 350 follows.

The admission control module 352 maintains information relating to resource utilization/availability and determines if sufficient resources are available to support the quality of service requirements of particular traffic flows. Resource availability information maintained by the admission control module 352 includes, e.g., packet and/or frame queuing capacity, scheduling capacity, as well as processing and memory capacity needed to support one or more traffic flows. The control signaling module 312 and/or other modules included in the access point 300 may, and in some embodiments do, query the admission control module 352 to determine if sufficient resources are available to support a new or modified traffic flow, where the admission control determination is a function of the quality of service requirements of the particular traffic flow and/or the available resources. The configuration information 351 may, and in some embodiments does, include configuration information, e.g., parameters settings, that affect the operation of the admission control module 352, e.g., an admission control threshold value that indicates the percentage of resource that may be allocated prior to rejecting additional requests.

The uplink scheduler module 353 controls processing relating to transmission scheduling, e.g., order and/or timing, and allocation of transmission resources, e.g., information coding rate, transmission time slots, and/or transmission power, for data information, e.g., messages, packets, and/or frames, to be sent from one or more access terminals to the access point via the wireless interface module 330. The uplink scheduler module 353 may, and in some embodiments does, schedule transmissions and allocate transmission resources as a function of the quality of service requirements and/or constraints associated with one or more traffic flows and/or one or more access terminals. The configuration information 351 may, and in some embodiments does, include configuration information, e.g., parameters settings, that affect the operation of the uplink scheduler module 353, e.g., a priority, rate bound, latency bound, and/or sharing weight associated with one or more traffic flows and/or access terminals. In some embodiments of the aspect, scheduling and/or resource allocation operations performed by the uplink scheduler module 353 are additionally a function of channel conditions and other factors, e.g., power budget.

The downlink scheduler module 354 controls processing relating to transmission scheduling, e.g., order and/or timing, and allocation of transmission resources, e.g., information coding rate, transmission time slots, and/or transmission power, for data information, e.g., messages, packets, and/or frames, to be sent from the access point 300 to one or more access terminals via the wireless interface module 330. The downlink scheduler module 354 may, and in some embodiments does, schedule transmissions and allocate transmission resources as a function of the quality of service requirements and/or constraints associated with one or more traffic flows and/or one or more access terminals. The configuration information 351 may, and in some embodiments does, include configuration information, e.g., parameters settings, that affect the operation of the downlink scheduler module 354, e.g., a priority, rate bound, latency bound, and/or sharing weight associated with one or more traffic flows and/or access terminals. In some embodiments of the aspect, scheduling and/or resource allocation operations performed by the downlink scheduler module 354 are additionally a function of channel conditions and other factors, e.g., power budget.

The uplink traffic conditioner module 355 controls processing relating to traffic conditioning, e.g., metering, marking, policing, etc., for data information, e.g., messages, packets, and/or frames, received via the wireless interface module 330, e.g., from an access terminal to the access point 300. The uplink traffic conditioner module 355 may, and in some embodiments does, condition traffic, e.g., meter, mark and/or police, as a function of the quality of service requirements and/or constraints associated with one or more traffic flows and/or one or more access terminals. The configuration information 351 may, and in some embodiments does, include configuration information, e.g., parameters settings, that affect the operation of the uplink traffic conditioner module 355, e.g., a rate bound, and/or marking value associated with one or more traffic flows and/or access terminals.

The uplink classifier module 356 controls processing relating to identification of data information, e.g., messages, packets, and/or frames, received via the wireless interface module 330, e.g., from an access terminal to the access point 300, as belonging to particular traffic flows prior to being processed by uplink traffic conditioner module 355. In some embodiments of the aspect, messages, packets, and/or frames received via the wireless communication interface module 330 are classified as belonging to one of a variety of traffic flows by the uplink classifier module 356 based on inspection of one or more header and/or payload fields. The results of classification by the uplink classifier module 356 may, and in some embodiments do, affect the treatment of the classified data information, e.g., messages, packets, and/or frames, by the uplink traffic conditioner module 355, e.g., the results may determine a particular data structure or state machine the message, packet, and/or frame will be associated with and further affect subsequent processing such as metering, marking, and/or policing. The configuration information 351 may, and in some embodiments does, include configuration information, e.g., parameters settings, that affect the operation of the uplink classifier module 356, e.g., a set of one or more classifier filter rules that prescribe criteria used to associate data information, e.g., messages, packets, and/or frames, as belonging to one or more traffic flows.

The uplink LLC (ARQ) module 357 controls LLC layer processing relating to receiving data information, e.g., packets and/or frames, via the wireless communication interface module 330, e.g., from an access terminal to the access point 300. The uplink LLC (ARQ) module 357 includes processing associated with ARQ capabilities, e.g., retransmission of lost packets or frames. In some embodiments of the aspect, the uplink LLC (ARQ) module 357 further includes processing relating to an LLC header and/or trailer that encapsulates higher layer messages, e.g., packets, which provides additional functionality, e.g., multi-protocol multiplexing/demultiplexing via a type field or error detection via a checksum field. The uplink LLC (ARQ) module 357 may also, and in some embodiments does, perform reassembly of frames received by the uplink PHY/MAC module 358 into higher layer messages, e.g., packets. The configuration information 251 may, and in some embodiments does, include configuration information, e.g., parameters settings, that affect the operation of the uplink LLC (ARQ) module 357, e.g., an ARQ window size, maximum number of retransmissions, a discard timer, etc.

The uplink PHY/MAC module 358 controls PHY layer and MAC layer processing relating to receiving data information, e.g., packets and/or frames, via the wireless communication interface module 330, e.g., from an access terminal to the access point 300. In some embodiments of the aspect, operation of the uplink PHY/MAC module 358 includes both sending and receiving control information, e.g., signals or messages, to coordinate receiving of data information, e.g., messages, packets, or frames. The configuration information 351 may, and in some embodiments does, include configuration information, e.g., parameters settings, that affect the operation of the uplink PHY/MAC module 358, e.g., a frequency, band, channel, spreading code or hoping code to be used for reception, an identifier associated with the access point 300, etc.

The downlink classifier module 359 controls processing relating to identification of data information, e.g., messages, packets, and/or frames, as belonging to particular traffic flows prior to being sent via the wireless communication interface module 330, e.g., from the access point 300 to an access terminal. In some embodiments of the aspect, messages, packets, and/or frames to be sent via the wireless communication interface module 330 are classified as belonging to one of a variety of traffic flows by the downlink classifier module 359 based on inspection of one or more header and/or payload fields. The results of classification by the downlink classifier module 359 may, and in some embodiments do, affect the treatment of the classified data information, e.g., messages, packets, and/or frames, by the downlink queue management module 361 and other modules 360, 362, 363, e.g., the results may determine a particular queue the message, packet, and/or frame will be associated with for storage and further affect subsequent processing such as scheduling. The configuration information 351 may, and in some embodiments does, include configuration information, e.g., parameters settings, that affect the operation of the downlink classifier module 359, e.g., a set of one or more classifier filter rules that prescribe criteria used to associate data information, e.g., messages, packets, and/or frames, as belonging to one or more traffic flows.

The downlink traffic conditioner module 360 controls processing relating to traffic conditioning, e.g., metering, marking, policing, etc., for data information, e.g., messages, packets, and/or frames, to be sent via the wireless interface module 330, e.g., from the access point 300 to an access terminal. The downlink traffic conditioner module 360 may, and in some embodiments does, condition traffic, e.g., meter, mark and/or police, as a function of the quality of service requirements and/or constraints associated with one or more traffic flows and/or one or more access terminals. The configuration information 351 may, and in some embodiments does, include configuration information, e.g., parameters settings, that affect the operation of the downlink traffic conditioner module 360, e.g., a rate bound, and/or marking value associated with one or more traffic flows and/or access terminals.

The downlink queue management module 361 maintains information and controls processing relating to storage of data information, e.g., messages, packets, and/or frames, to be sent via the wireless communication interface module 330, e.g., from the access point 300 to an access terminal. The downlink queue management module 361 may, and in some embodiments does, control storage of data information awaiting transmission and maintain state information regarding data information awaiting transmission on a per traffic flow basis, e.g., packets associated with each traffic flow may be stored in separate queues. In some embodiments of the aspect, the downlink queue management 361 module supports a variety of queue management techniques and/or capabilities, e.g., head drop, tail drop, as well as various AQM mechanisms such as RED. The configuration information 351 may, and in some embodiments does, include configuration information, e.g., parameters settings, that affect the operation of the downlink queue management module 361, e.g., a queue limit, drop strategy, and/or AQM thresholds associated with one or more traffic flows.

The downlink LLC (ARQ) module 362 controls LLC layer processing relating to sending data information, e.g., messages, packets, and/or frames, via the wireless communication interface module 330, e.g., from the access point 300 to an access terminal. The downlink LLC (ARQ) module 362 includes processing associated with ARQ capabilities, e.g., retransmission of lost packets or frames. In some embodiments of the aspect, the downlink LLC (ARQ) module 362 further includes processing relating to the addition of an LLC header and/or trailer to higher layer messages, e.g., packets, to provide additional functionality, e.g., multi-protocol multiplexing/demultiplexing via a type field or error detection via a checksum field. The downlink LLC (ARQ) module 362 may also, and in some embodiments does, perform fragmentation of higher layer messages, e.g., packets, into multiple sub-portions, e.g., frames to be sent by the downlink PHY/MAC module 363. The configuration information 351 may, and in some embodiments does, include configuration information, e.g., parameters settings, that affect the operation of the downlink LLC (ARQ) module 362, e.g., an ARQ window size, maximum number of retransmissions, a discard timer, etc.

The downlink PHY/MAC module 363 controls PHY layer and MAC layer processing relating to sending data information, e.g., messages, packets, and/or frames, via the wireless communication interface module 330, e.g., from the access point 300 to an access terminal. In some embodiments of the aspect, operation of the downlink PHY/MAC module 363 includes both sending and receiving control information, e.g., signals or messages, to coordinate sending of data information, e.g., messages, packets, or frames. The configuration information 351 may, and in some embodiments does, include configuration information, e.g., parameters settings, that affect the operation of the downlink PHY/MAC module 363, e.g., a frequency, band, channel, spreading code or hopping code to be used for transmissions, an identifier associated with the access point 300, etc.

Figure 4:
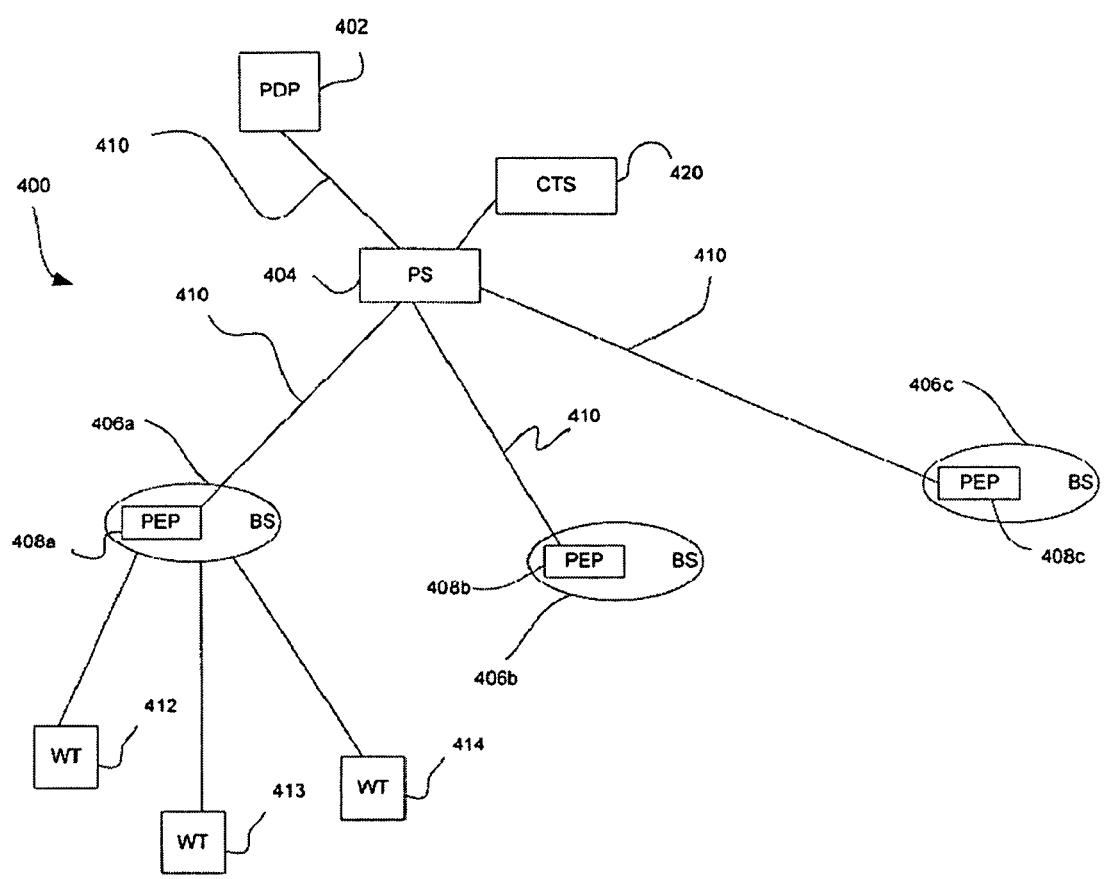
FIG. 4 illustrate a zone of a communication system according to an aspect.

FIG. 4 illustrate a zone of a communication system 400 according to an aspect. The zone comprises a PDP 402 which is in communication with a MAPS proxy server (PS) 404. The proxy server 404 is in communication with the PEP of a plurality of ANs, for example 408a-c and 406a-c, respectively. The number of PEPs that are in communication with PS may vary depending on the deployment of the system. Each base station 408a communicates with a plurality of wireless terminals (412, 413, and 414) at any given time. According to an aspect of some embodiments, the PDP 402 uses a MAPS protocol 410 to communicate with PS and PS uses MAPS protocol to communicate with each PEP 408a of the AN 406a.

In an aspect, when user desires to establish a service session or modify an existing session, for example multimedia session, the user using a wireless terminal 412 request to establish a session. This request is handled by the PEP 408 of the AN 406. The PEP 408 requests authorization for new sessions or modifications of existing sessions from the PDP. The PEP 408 uses a MAPS protocol 410, which is a request-response type protocol. In an aspect, MAPS comprises the following objects a PEP identifier (PEPid.) and PDP identifier (PDPid). The PEP identifier may be the IP address of the PEP and the PDP identifier may be the IP address of the PDP. MAPS allows PEPs and PDPs to communicate directly or through a MAPS proxy server 404. The presence of a MAPS proxy is only known to the PEPs through configuration. PEPs can be configured to operate in proxy mode or direct mode. Proxies are completely transparent to PDPs. In an aspect of the communication model, PEPs are always aware of the ultimate PDPid. This awareness is needed in order to allow the proxy server to route requests to the right PDP. PDPids may be present in all requests and responses sent from a PEP when it is configured to communicate through a proxy. Proxies are transaction-stateful. That is, they keep information for outstanding transactions and need not keep it after a response is sent. Proxies route messages from the PEP to the PDP and from the PDP to the PEP. When a request is sent from the PEP to the PDP through a proxy, the PDPid and PEPid are used, wherein PEPid contain the PEP's IP address. When the proxy forwards the PEP's request, it places its own IP address in the PEPid object, which makes it appear as a PEP to the PDP. When communicating through a proxy, routing of unsolicited messages from the PDP to the PEP may be done based on the proxy's knowledge of the location of the WT associated with the session in question. In an aspect, the proxy is connected to a context transfer server (CTS) 420 that maintains the location of the WT in a database. Thus, proxy is able to determine which PEP is currently serving the WT.

In an aspect, the requests are initiated by the PEP. However, the PDP can revoke a session at any time. Hence, the PEP listens to the same port as the PDP through the proxy to accommodate unsolicited messages. Also, MAPS provides a mechanism for liveness checks between the PEP and the PDP. This is done using a keep-alive message. This allows the PEP to ensure that a connection to PDP is not lost, for example due to rebooting of the PDP.

In an aspect, a proxy server is employed which communicates to a PDP and one or more PEP using a Mobility Aware Policy Signaling (MAPS) protocol. The protocol is designed to run between a Policy Enforcement Point (PEP) and a Policy Decision Point (PDP). The aim of this protocol is to allow Policy decisions to be made and communicated to ANs for mobile or stationary wireless terminals. FIG. 4 illustrate an aspect of the communication system.

The MAPS protocol deals with Policy services in a mobile environment. MAPS runs between a Policy Enforcement Point (PEP) and a Policy Decision Point (PDP). The protocol can run directly between two ANs through a proxy. The existence of a proxy is completely transparent to the PDP. Only the PEP is aware of the presence of a proxy.

The protocol also includes liveliness checks between the PEP and PDP. Failure of either end (PEP or PDP) can be detected by the other end and the necessary actions are triggered.

The MAPS protocol allows for communication between PEPs and PDPs. In an aspect MAPS is used to communicate to proxy. This is useful in cases where ease of management and scalability requirements make it easier to associate fewer PEPs to a PDP. In this case, the proxy server is a back-to-back PEP/PDP that appears like a PDP to the PEP and a PEP to the ultimate PDP. This allows for a more scalable trust and signaling management between PEPs and PDPs, especially when dealing with liveliness checks. MAPS is designed to make the presence of a proxy transparent to the PDP. However, support for communication through a proxy may be configurable in the PEP.

In an aspect, the following messages are used using the MAPS protocol.
   1.: Request (REQ).
   2.: Modify (MOD).
   3.: Decision (DEC)
   4.: Acknowledgement (ACK)
   5.: Delete (DEL)
   6.: Revoke (RVK).
   7.: Keepalive (KA).
   8.: Reset (RST).

In an aspect, the above messages comprises one or more of the following object:
   1.: Session handle (SHE).
   2.: Service identifier (SID)
   3.: Classifier (CLS).
   4.: Authorization token (AUT).
   5.: PEP identifier (PEPid.)—This field contains the PEP identifier. The PEP identifier may be the IP address of the PEP.
   6.: Message authentication code (MAC).
   7.: PDP identifier (PDPid)—This field contains the PDP identifier. The PDP identifier may be the IP address of the PDP.

The following values are allocated for the Status field:
   0: Success
   128: Failure reason unspecified
   129: Failure authentication failed.
   130: Format error.
   131: Not the serving PDP for this session.
   132: Session does not exist.
   133: Administratively prohibited.
   134: Insufficient resources.
   135: Unknown object.
   136: Resource does not exist.
   137: Service Class not allowed for this session.
   138: Service Class administratively prohibited.
   139: Invalid session classifier.

MAPS is a request-response protocol that runs between the PEP and the PDP. The PEP requests authorization for new sessions or modifications of existing sessions from the PDP. The only exception to this rule is the revocation or deletion of an existing session. Either the PDP or the PEP can remove a session. Whenever a session is removed by one end, a message is sent to inform the other end about the removal of such session. Hence, this does not represent a request that awaits a response to confirm the removal of a session.

Requests are initiated by the PEP. However, the PDP can revoke a session at any time. Hence, the PEP must listen to the same port as the PDP to accommodate unsolicited messages. MAPS provides a mechanism for liveness checks between the PEP and the PDP. This is done using the KA message. In addition, to detect quick failures that take place between two KA messages, the failed node sends an RST message after booting to indicate loss of state.

In an aspect, MAPS allows PEPs and PDPs to communicate directly or through a MAPS proxy server (e.g. MAPS proxy). The presence of a MAPS proxy is only known to the PEPs through configuration. PEPs can be configured to operate in proxy mode or direct mode. Proxies are completely transparent to PDPs. Within this communication model, PEPs are always aware of the ultimate PDPid. This awareness is needed in order to allow the proxy server to route requests to the right PDP. PDPids may be present in all requests and responses sent from a PEP when it is configured to communicate through a proxy. Proxies are transaction-stateful. That is, they keep information for outstanding transactions and need not keep it after a response is sent. Proxies route messages from the PEP to the PDP and from the PDP to the PEP. When a request is sent from the PEP to the PDP through a proxy, the PDPid and PEPid are used, wherein PEPid contain the PEP's IP address. When the proxy forwards the PEP's request, it places its own IP address in the PEPid object, which makes it appear as a PEP to the PDP. When communicating through a proxy, routing of unsolicited messages from the PDP to the PEP SHOULD be done based on the proxy's knowledge of the location of the WT associated with the session in question. In an aspect, the proxy is connected to a context transfer server that maintains the location of the WT in a database. Thus, proxy is able to determine which PEP is currently serving the WT.

The REQ message is sent by the PEP to the PDP. The purpose of the REQ message is to authorize the allocation of resources to a device. The REQ message contains the following options:
PEPid.
[PDPid] This is only needed when the message is sent to a proxy.
AUT.
SID.
CLS
MAC.

The REQ message may contain one or more CLS objects indicating more than one classifier for the same session. However, one AUT and SID object may be present in this message. Upon receiving the REQ message the PDP verifies the MAC. If the verification of the MAC fails, the message may be silently discarded and the PDP may log this event in its management system. Alternatively, the PDP may also send a DEC message with status code set to 129 (authentication failure). If the MAC verification is successful the PDP checks if the AUT is associated with an existing session.

In an aspect, if the AUT did not correspond to an existing session, the PDP may respond with a DEC message with a Status field set to 132 (Session does not exist). If a format error was detected in the REQ message or an unknown object was present, the PDP may send a DEC message with the Status field set to 130 (Format error) or 135 (Unknown object). If Status 135 is used, the PDP may include the unknown object in the response. In all of the error cases above, the DEC message may contain the MAC object to avoid DoS attacks on the PEP.

If the AUT is associated with an ongoing session, the PDP checks if the session attributes match those contained in the CLS object(s). If the session attributes do not match, the PDP may respond with a DEC message with a Status code set to 139 (invalid session classifier).

If the session attributes match, the PDP checks the Service Class associated with the session. If local policies prohibited the authorization of resources, the PDP SHALL send a DEC message with the Status field set to 133 (Administratively prohibited). If local policies do not prohibit the allocation of resources to that session, the PDP authorizes the resource and prepares a DEC message in response. The DEC message is sent to the PEP. The Status code is set to zero, indicating success.

If the DEC message indicates success the PDP may create a session handle based on the ongoing session's information received in the REQ message. This is needed to allow the PDP to use it as a resource handle for future transactions. The DEC message contains the following options:
PEPid
SID
CLS
MAC In an aspect, a MOD message is used to request authorization to modify resources associated with a particular session. This message is sent from the PEP to the PDP. Like the REQ message, the MOD message contains the following objects:
PEPid.
[PDPid] This is only needed when the message is sent to a proxy.
SHE
SID.
CLS
MAC.

One or more CLS objects can be present in this message as long as they all correspond to the same session indicated by the AUT object. Upon receiving the REQ message the PDP verifies the MAC. If the verification of the MAC fails, the message might be silently discarded and the PDP should log this event in its management system. Alternatively, the PDP MAY also send a DEC message with Status code set to 129 (authentication failure). If the MAC verification is successful the PDP checks if the SHE is associated with an existing session.

The SHE object must correspond to an existing session, If it did not, the PDP may respond with a DEC message with a Status field set to 132 (Session does not exist).

If a format error was detected in the REQ message or an unknown object was present, the PDP may send a DEC message with the Status field set to 130 (Format error) or 135 (Unknown object). If Status 135 is used, the PDP may include the unknown object in the response.

The MOD message contains new or modified CLS or SID objects. When processing the CLS and SID objects, the PDP will check if local policies prohibit the use of such objects. If local policies prohibited the authorisation of resources, the PDP may send a DEC message with the Status field set to 133 (Administratively prohibited). If local policies do not prohibit the allocation of resources to that session, the PDP authorizes the resource after associating the AUT with the new information included in the SID and CLS objects. The PDP also prepares a DEC message in response. The DEC message is sent to the PEP. The Status code is set to zero, indicating success.

The DEC message contains the following options:
PEPid
SID
CLS
MAC

Resources can be revoked by either the PEP or the PDP. The PEP requests resource revokation by sending the DEL message to the PDP, while the PDP revokes resources by sending the RVK message to the PEP.

The PEP may revoke an existing resource by sending a DEL message to the PDP. The DEL message contains the following options:
PEPid
PDPid
SHE
MAC Upon receiving the DEL message the PDP verifies the MAC object. If the verification fails, the message is silently discarded and an error may be logged in the PDP's management system. Alternatively, the PDP may send an ACK message with the Status field set to 129 (authentication failure). If the MAC verification is successful, the PDP locates the session corresponding to the SHE object. If the session is located, the application server is informed about the revocation of the associated resources. The PDP then sends an ACK message to the PEP. The ACK message contains the same Transaction identifier as the DEL message and a Status field set to zero, to indicate success. In addition, the ACK message contains the following options:
PDPid
SHE
MAC If the PEP receives an ACK message containing any error code in the Status field (e.g. format error), it may attempt to resend the DEL message. Otherwise, the PEP MAY consider the transaction finished.

The PDP may revoke resources by sending a RVK message to the PEP. The RVK message contains the following options:
PDPid
MAC
SHE Upon receiving the RVK message, the PEP verifies the MAC object. If the verification fails, the message is silently discarded. If the verification is successful, the PEP locates the resource based on the information in the SHE object. If the resource is found, the PEP removes it and responds with an ACK message with the Status field set to zero, indicating success. If the resource is not found, the PEP sends an ACK message with the Status field set to 136 (Resource does not exist).

The ACK message contains the following options:
PEPid
[PDPid] This is only needed when the message is sent to a proxy.
MAC The PDP need not retry if an ACK message is received with Status code 132 and may resend the RVK message if the ACK message contained Status codes 130, 134, or 135.

In an aspect, liveness checks are performed between the PEP and PDP directly, or through a proxy server if one is present. A liveness check is done by sending the KA message from the PEP to the PDP. The KA message contains a transaction id and requires a KA response with the same transaction id.

Direct liveness checks are done by sending the KA message from the PEP to the PDP. The PEP may be configured with an inter-KA-timer that allows it to decide when to send the KA message. The PEP always initiates the liveness check. The KA message sent from the PEP contains the following options:
PEPid
MAC Upon receiving the KA message, the PDP verifies the MAC object. If verification fails, the message is silently discarded. Otherwise, the PDP sends a KA message with the same transaction id and the following options:
PDPid
PEPid
MAC In the case where the PEP receives no response within the KATimeoutPeriod, it may resend the KA message with a new transaction id. If no response is received after two retransmissions the PDP is assumed to have failed. As a result, the PEP may locally revoke resources authorised by that PDP. Note that the timeout between the first transmission and future retransmissions of the KA message remains unchanged to allow for a speedy detection of PDP failures.

In the case where either the PEP or the PDP reboots or loses information about current resources or sessions, respectively, the RST message may be sent. The RST message sent from the PDP to the PEP may contain the following options:
PDPid
MAC This message serves to tell the PEP that all information about ongoing sessions authorised by this PDP have been lost. Hence, the PEP SHALL revoke resources associated with this PDP and respond with an ACK message containing the same transaction id and the following options:
PEPid
MAC If the RST message is sent from the PEP, it SHALL contain the following options:
PEPid
MAC The PDP's response to this message is an ACK message with the following options:
PDPid
MAC Since the proxy is only visible to the PEP, liveness checks through the proxy are asymmetric in nature. That is, the KA message is sent from the proxy to the PDP independently from those KA messages sent from the PEP to the proxy.

Hence, the proxy is expected to be stateful when it comes to the liveness of PDPs. The proxy, acting like a PEP, monitors the liveness of PDPs and responds to KA messages from the PEP based on such information.

If a PDP fails the liveness checks with the proxy, or if it sends a RST message containing its own address in the PDPid object to the proxy, the proxy may send a RST message to all PEPs who share authorization information about ongoing sessions with that PDP. The RST message may contain the following options:
PDPid
MAC The PDPid extension includes the identity of the failed PDP. Note that more than one PDPid may be present in this message if more than one PDP failed the liveness checks with the proxy. Apart from the above checks, liveness checks between the PEP and the proxy are identical to those done between a PEP and a PDP. The purpose of the liveness checks with the proxy is to ensure that the proxy itself is functioning. Since the proxy is responsible for liveness checks with other PDPs, it is implicit that other PDPs are live unless the proxy sends the RST message. Note that in the case of a proxy failure, or in case the proxy included its own address in the RST message, the PEP may revoke all resources that were authorized through that proxy.

In an aspect, a retransmission methodology is used. Within this system, the PEP function is located in the BS and is therefore expected to be aware of the WT's presence within its coverage area. Hence, retransmission of unanswered requests are only useful if the PEP is aware that the WT has not moved to another BS. If the WT had moved to another BS and an outstanding request pertaining to the WT exists, the PEP SHALL ignore the transaction.

While the WT is present in the BS' coverage area, timeouts may result in retransmission of outstanding requests. The timeout period for all requests from the PEP (with the exception of the KAtimeoutperiod) is set to MAPSTimeout. The default value for MAPSTimeout is 250 ms. The same value applies to timeouts to PDP requests.

Figure 5:
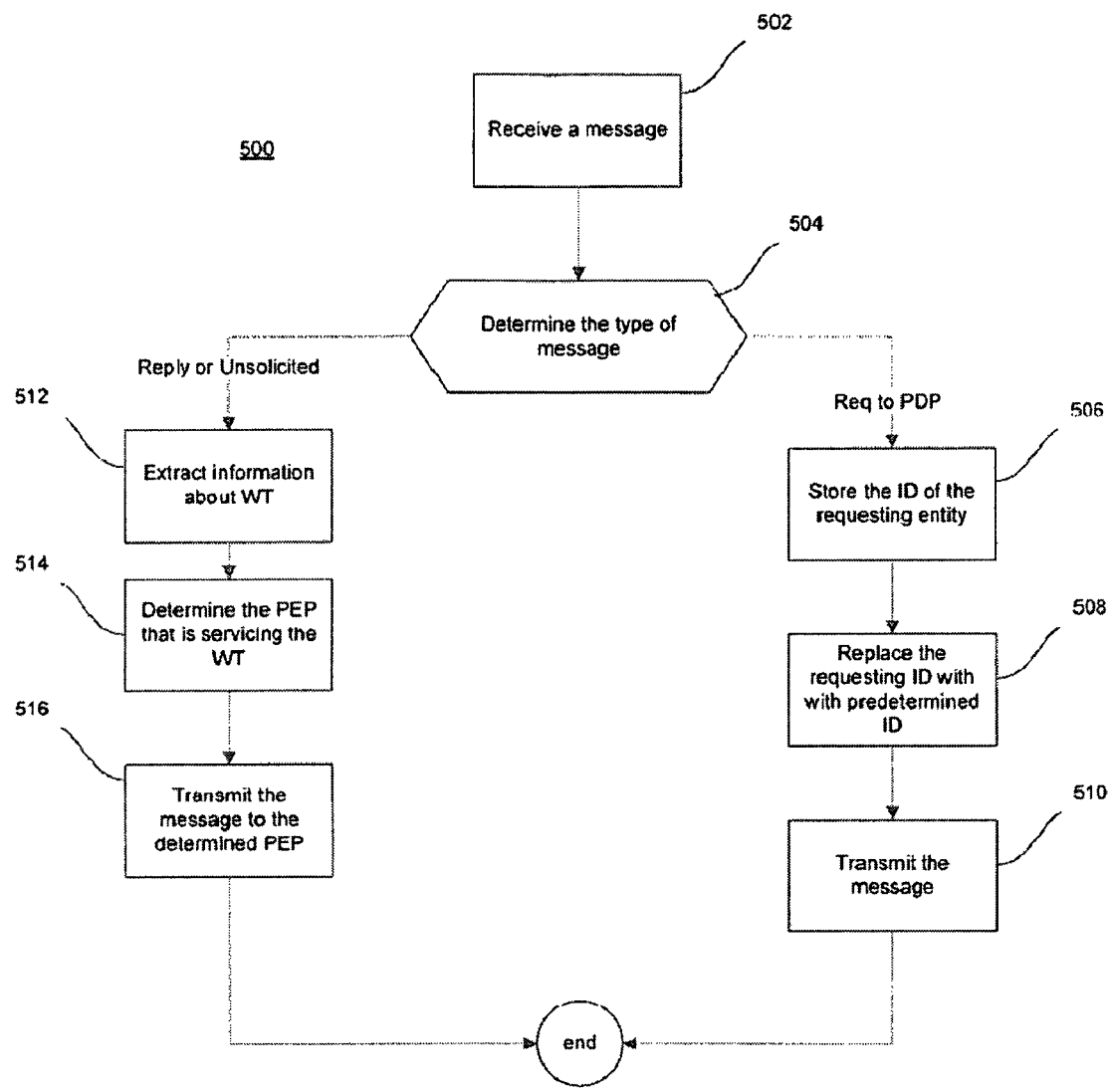
FIG. 5 illustrates a flow of a routine according to an aspect of some embodiments.

A timeout may result in retransmitting the original request. After retransmitting the original request, the timeout period for this transaction is set to 2*MAPSTimeout. After two retransmissions, the requester may terminate this transaction and check the liveness of the receiver. FIG. 5 illustrates a flow of a routine 500 according to an aspect of some embodiments. The processor of a proxy server 404 is configured to execute the routine. The proxy server may comprise a memory for storing information about the PS 404 (for example IP address of PS) and information about the PEP 408 and PDP 402. At block 502, the processor is configured to receive a message. This message may be one of the messages of a list of messages. The list of messages comprises a Request (REQ) message, a Modify (MOD) message, a Decision (DEC) message, an Acknowledgement (ACK) message, a Delete (DEL) message, a Revoke (RVK) message, a Keepalive (KA) message, and a Reset (RST) message. In an aspect, REQ always comes from the PEP, and DEC always comes from the PDP. Where the source is not clearly known the PS will forward the message to the intended destination, which is either included in the message or deduced based on the message type. Since, the PS 404 can receive messages from either the PDP or PEP, at block 504, the processor is configured to determine the type of message received. If determined that the received message was a request message, then at block 506, the processor is configured to extract information (i.e., PEP identifier) about the requesting entity (for example the PEP 408) from the message and store it in memory. At block 508, the processor is configured to replace the PEP identifier (PEPid) of the message with it own predetermined identifier (PSid). This indicate to PDP 402, where to send information. By replacing the requesting entity with PSid, the reply will messages will be directed to the PS 404. At block 510, the processor is configured to transmit the message to PDP. If at block 504, it is determined that the message is an ACK message or some other unsolicited message (for example a Delete (DEL) message, a Revoke (RVK) message) from PDP, then at block the processor is configured to extract information about the which WT is affected by message. Depending on the message, for example if the message is DEC then it includes the WT identifier which is used to look up its location. Otherwise, if for example a RST message then it only needs to lookup the PEPs that deal with that PDP (if RST is coming from the PDP) or the PDP that deals with that PEP (if the RST came from a PEP). The lookup in those cases is based on the PDPid or PEPid, respectively. All this information should be available in CTS. After determining the WT information at block 514, the processor is configured to determine which PEPid (for example the second destination id) to use. In an aspect, the location information of WT may be extracted from context transfer server (CTS) 420 database. Using that location information of WT, the processor determines which PEP is currently servicing the WT. At block 516, the processor is configured to transmit the message to PEP that is currently servicing the WT by replacing the PEPid portion of the message to be transmitted with PEPid of the servicing PEP.

Figure 6:
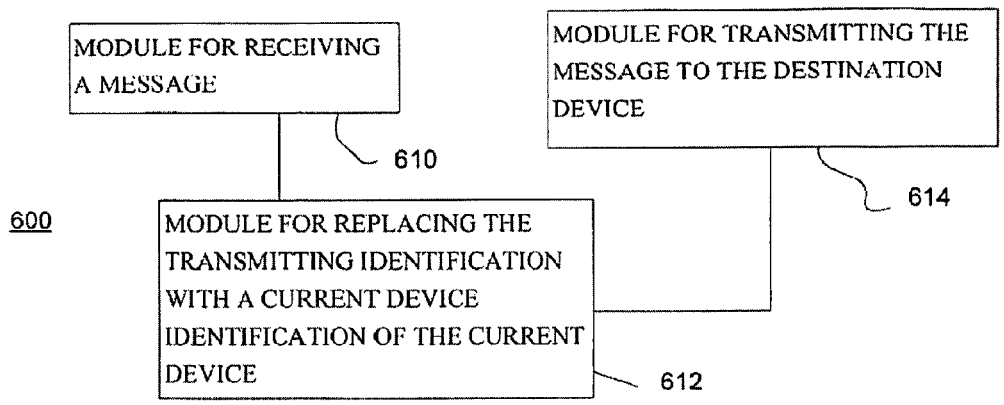
FIG. 6 illustrates the use of one or more modules to carry out the methodologies 600 according to an aspect of some embodiments.

FIG. 6 illustrates the use of one or more modules to carry out the methodologies 600 according to an aspect of some embodiments. The modules referred to in FIG. 6 and may be an electronic devices, processors, hardware devices, storage mediums, etc. or any combination thereof. In an aspect, an apparatus for facilitating policy decision in a communication system, the apparatus comprising means for receiving a message, at a current device, wherein the message comprising a transmitting device identification of a transmitting device and a destination device identification of a destination device, wherein the means comprises a module 610. Apparatus further comprises a means for replacing, the transmitting identification with a current device identification of the current device, wherein the means comprises a module 612; Apparatus further comprises a means for transmitting the message to the destination device, wherein the destination device configured to make policy decisions, wherein the means comprises a module 614.

Figure 7:
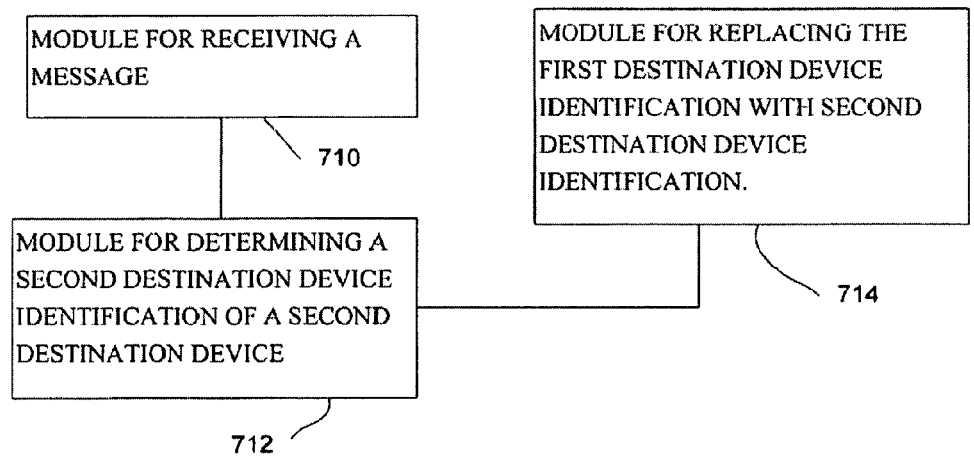
FIG. 7 illustrates the use of one or more modules to carry out the methodologies 700 according to an aspect of some embodiments.

FIG. 7 illustrates the use of one or more modules to carry out the methodologies 700 according to an aspect of some embodiments. The modules referred to in FIG. 7 and may be an electronic devices, processors, hardware devices, storage mediums, etc. or any combination thereof. In an aspect, an apparatus for facilitating policy decision in a communication system, the apparatus comprising means for receiving a message, at a current device, the message comprising a first destination device identification of a first destination device means for receiving a message, at a current device, the message comprising a first destination device identification of a first destination device, wherein the means comprises a module 710. Apparatus further comprises a means for determining a second destination device identification of a second destination device by accessing a location information of a wireless terminal, wherein the means comprises a module 712; Apparatus further comprises a means for replacing the first destination device identification with second destination device identification, wherein the means comprises a module 714.

Messages described in the present patent application are stored in the memory of the nodes (proxy servers, ANs, terminals, etc.) which generate and/or receive said messages in addition to the nodes through which said messages are communicated. Accordingly, in addition to being directed to methods and apparatus for generating, transmitting and using novel messages of the present invention, the present invention is also directed to machine readable media, e.g., memory, which stores one or more of the novel messages of the type described and shown in the text and figures of the present application.

In various embodiments, nodes described herein are implemented using one or more modules to perform the steps corresponding to one or more methods of the aspect, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the aspect is directed to a machine-readable medium including machine executable instructions for causing a machine, e.g., processor and associated hardware, to perform one or more of the steps of the above-described method(s).

Numerous additional variations on the methods and apparatus of the aspects described above will be apparent to those skilled in the art in view of the above description of the aspect. Such variations are to be considered within the scope of the aspect. The methods and apparatus of the aspects may be, and in various embodiments are, used with OFDM, CDMA, TDMA or various other types of communications techniques which may be used to provide wireless communications links between access nodes and mobile nodes. In some embodiments the access nodes are implemented in core routers or gateways, which establish IP communications with mobile nodes thru an intervening access network. In some embodiments the access nodes are implemented as base stations, which establish direct communications links with mobile nodes using OFDM, CDMA and/or TDMA over which IP communications flow. In various embodiments the mobile nodes are implemented as notebook computers, PDAs, or other portable devices including receiver/transmitter circuits and logic and/or routines, for implementing the methods of the aspects described above.

What is claimed is:

1. A method of facilitating policy decisions in a communication system, the method comprising:
   receiving a message from an access node in communication with a mobile wireless terminal at a current device, wherein the message comprises mobility aware policy signaling information, and wherein the message further comprises a transmitting device identification of a transmitting device and a destination device identification of a destination device;
   replacing the transmitting identification with a current device identification of the current device; and
   transmitting the message to the destination device, wherein the destination device is configured to make policy decisions.

2. The method as claimed in claim 1, wherein receiving the message at the current device comprises receiving the message at a proxy server.

3. The method as claimed in claim 2, wherein receiving the message comprises receiving an authentication token, a message authentication code and a classifier.

4. The method as claimed in claim 1, wherein the access node comprises a policy enforcement point.

5. The method as claimed in claim 1, wherein transmitting the message to the destination device comprises transmitting the message to a policy decision point.

6. The method as claimed in 1, wherein transmitting the message comprises transmitting a keep alive message for performing a liveness check.

7. The method of claim 1, wherein the mobility aware policy signaling information comprises a session handle object for use in associating the wireless terminal with the message.

8. An apparatus for facilitating policy decisions in a communication system, the apparatus comprising:
   means for receiving a message from an access node in communication with a mobile wireless terminal at a current device, wherein the message comprises mobility aware policy signaling information, and wherein the message further comprises a transmitting device identification of a transmitting device and a destination device identification of a destination device;
   means for replacing the transmitting identification with a current device identification of the current device; and
   means for transmitting the message to the destination device, wherein the destination device is configured to make policy decisions.

9. The apparatus as claimed in claim 8, wherein the means for receiving the message at current device comprises means for receiving the message at a proxy server.

10. The apparatus as claimed in claim 9, wherein means for receiving the message comprises means for receiving an authentication token, a message authentication code and a classifier.

11. The apparatus as claimed in claim 8, wherein the access node comprises a policy enforcement point.

12. The apparatus as claimed in claim 8, wherein means for transmitting the message to the destination device comprises means for transmitting the message to a policy decision point.

13. The apparatus as claimed in 8, wherein means for transmitting the message comprises transmitting a keep alive message for performing a liveness check.

14. The apparatus of claim 8, wherein the mobility aware policy signaling information comprises a session handle object for use in associating the wireless terminal with the message.

15. A proxy server for facilitating policy decisions in a communication system, the apparatus comprising:
   a memory for storing one or more identification information, wherein the memory comprises a current device identification; and
   a processor, the processor coupled to the memory and configured to receive a message from an access node in communication with a mobile wireless terminal, wherein the message comprises mobility aware policy signaling information, and wherein the message further comprises a transmitting device identification of a transmitting device and a destination device identification of a destination device; the processor further configured to replace the transmitting identification with the current device identification; and the processor further configured to transmit the message to the destination device, wherein the destination device is configured to make policy decisions.

16. The apparatus as claimed in claim 15, wherein the access node comprises a policy enforcement point.

17. The apparatus as claimed in claim 15, wherein the message is transmitted to a policy decision point.

18. The apparatus as claimed in claim 15, wherein the message comprises an authentication token, a message authentication code and a classifier.

19. The apparatus of claim 15, wherein the mobility aware policy signaling information comprises a session handle object for use in associating the wireless terminal with the message.

* * * * *